US012652740B2

(12) United States Patent 
Brodsky et al.

(10) Patent No.: US 12,652,740 B2 
(45) Date of Patent: Jun. 9, 2026

(54) POWER CONSERVATION TOOLS AND TECHNIQUES FOR EMERGENCY VEHICLE LIGHTING SYSTEMS

(71) Applicant: Fire Research Corporation, Nesconset, NY (US)

(72) Inventors: Tomas Brodsky, Coquitlam (CA); Peter Luhrs, Nesconset, NY (US)

(73) Assignee: Fire Research Corporation, Nesconset, NY (US)

( * ) Notice: Subject to any disclaimer, the term of this patent is extended or adjusted under 35 U.S.C. 154(b) by 0 days.

(21) Appl. No.: 18/151,716

(22) Filed: Jan. 9, 2023

(65) Prior Publication Data

US 2023/0225036 A1 Jul. 13, 2023

Related U.S. Application Data

(60) Provisional application No. 63/297,907, filed on Jan. 10, 2022.

(51) Int. Cl.

| | |
|---|---|
| *H05B 47/125* | (2020.01) |
| *A62C 27/00* | (2006.01) |
| *B60Q 1/24* | (2006.01) |
| *B60Q 1/52* | (2006.01) |
| *H05B 47/175* | (2020.01) |

(52) U.S. Cl.
CPC .......... *H05B 47/125* (2020.01); *B60Q 1/247* (2022.05); *B60Q 1/249* (2022.05); *B60Q 1/52* (2013.01); *H05B 47/1965* (2024.01); *A62C 27/00* (2013.01); *B60Q 2900/30* (2013.01)

(58) Field of Classification Search
CPC ........ B60Q 1/0023; B60Q 1/26; B60Q 9/008; B60Q 9/00; B60Q 3/30; B60Q 2300/42; B60Q 1/143
See application file for complete search history.

(56) References Cited

U.S. PATENT DOCUMENTS

| | | | | |
|---|---|---|---|---|
| 10,850,665 | B1 * | 12/2020 | Miller | .............. G01S 15/88 |
| 2006/0091817 | A1 * | 5/2006 | Herrig | ............. B60Q 1/34 |
| | | | | 340/331 |
| 2015/0028741 | A1 * | 1/2015 | Schmidt | ........... B60Q 1/1423 |
| | | | | 315/82 |
| 2017/0096095 | A1 * | 4/2017 | Uhrenholt | ........... F21S 43/26 |

(Continued)

*Primary Examiner* — Wei (Victor) Y Chan 
(74) *Attorney, Agent, or Firm* — Leech Tishman Fuscaldo & Lampl, LLC

(57) ABSTRACT

An illumination control system is configured for operative association with a vehicle lighting system of an emergency vehicle, such as a fire truck or other first responder type of vehicle. The illumination control system includes a video analysis module configured for receiving data from one or more cameras positioned on an exterior of the vehicle, and each camera has an associated region of interest (ROI) defined for a field-of-view for the camera. An artificial intelligence (AI) module is provided to detect whether a person or object of interest has entered the ROI of the camera. The control system includes an algorithm processing module programmed for executing logic associated with one or more decision-making tasks in association with the operation of the AI module. Also, a light control module can be provided for communicating instructions for activating or deactivating various scene lights of the vehicle lighting system.

14 Claims, 4 Drawing Sheets

(56)         References Cited

U.S. PATENT DOCUMENTS

| 2017/0120804 | A1* | 5/2017 | Kentley | B60Q 1/525 |
| 2018/0105107 | A1* | 4/2018 | Hassan-Shafique | G08G 1/164 |
| 2018/0255622 | A1 | 9/2018 | Spero | |
| 2021/0046861 | A1* | 2/2021 | Li | G06T 7/174 |
| 2022/0306152 | A1* | 9/2022 | Zhang | B60W 60/0017 |

* cited by examiner

POWER CONSERVATION TOOLS AND TECHNIQUES FOR EMERGENCY VEHICLE LIGHTING SYSTEMS

CROSS-REFERENCE TO RELATED APPLICATION/PRIORITY CLAIM

The present non-provisional patent application claims the priority benefit of U.S. Provisional Patent Application Ser. No. 63/297,907, filed on Jan. 10, 2022, the entirety of which is hereby incorporated by reference into the present application.

FIELD OF THE INVENTION

In various embodiments, the present invention generally relates to computer-based tools, devices, and processes for intelligently determining the timing and activation of a lighting system used in connection with an emergency vehicle (e.g., fire trucks, ambulances, maintenance vehicles, and others) to maximize effective illumination while minimizing the power necessary to operate the lighting system.

BACKGROUND

Emergency vehicles require proper lighting to illuminate areas in and around the scene of emergency situations such as fires, traffic accidents, industrial accidents, and many other such situations. Emergency personnel working at the emergency scene need adequate lighting in order to see the critical aspects of the scene.

Existing techniques involve activating lights on the emergency vehicle and having the lights activated until they are manually deactivated, or until there is a threshold voltage drop in the vehicle's electrical systems. It is typical when arriving on an emergency scene for the operator to turn on all exterior lights to ensure effective illumination of the scene for emergency personnel working there. Voltage drops in the vehicle electrical system occur when the total electrical load of devices employed by the vehicle exceeds the electrical output provided by the alternator of the vehicle. After a sufficient number of electrical loads are shed, then the alternator is able to replenish the batteries of the vehicle. However, with the advent of electrical fleet vehicles, waiting for the voltage to drop is not desirable. If the vehicle is all electric (i.e., it does not use a diesel engine or it is a hybrid vehicle), the batteries cannot be adequately recharged.

To preserve battery life and other electrical resources for the emergency vehicle, tools and techniques are needed for managing and controlling exterior lighting systems that are not in immediate use at the emergency scene.

DESCRIPTION

In developing the various embodiments of the invention, the inventors have realized that by determining whether or not an emergency vehicle lighting system is actually being used, the lights can be dimmed or brightened as needed, or even automatically deactivated when not needed by emergency personnel. As applied herein, a "vehicle" may include land-based vehicles such as fire trucks, ambulances, maintenance vehicles, and the like; water-based vehicles such as boats, ships, or other water-borne vessels; or air-based or space-based vehicles such as helicopters, planes, ships, or other aircraft or spacecraft.

Figure 1:
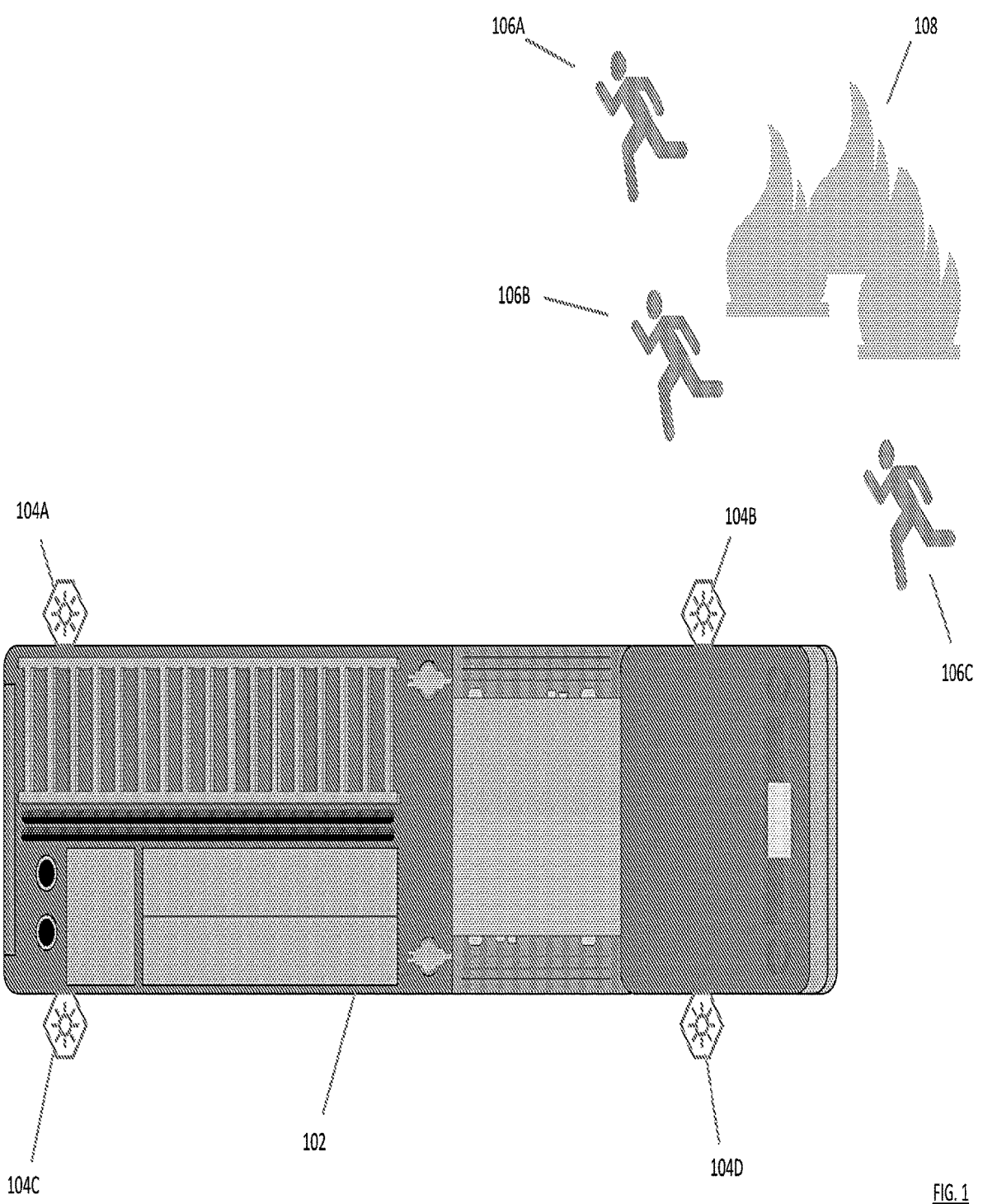
FIG. 1 schematically illustrates an example of an emergency vehicle having a lighting system comprising multiple exterior lights positioned at various locations on the exterior of the vehicle.

FIG. 1 illustrates an example of an emergency vehicle 102 having a lighting system comprising multiple exterior lights 104A-104D positioned at various locations on the exterior of the vehicle. The lights 104A-104D may be used to provide illumination of regions of interest in the vicinity of the vehicle 102, such as when the vehicle 102 is in use to respond to an emergency situation. In this example, emergency personnel 106 include various fire fighters 106A-106C responding to a fire 108 at the emergency scene. It can be appreciated that the exterior lighting systems of the vehicle 102 can be powered by electrical systems of the vehicle 102, for example, and that the number and position of the exterior lights may be varied from configuration to configuration.

Figure 2:
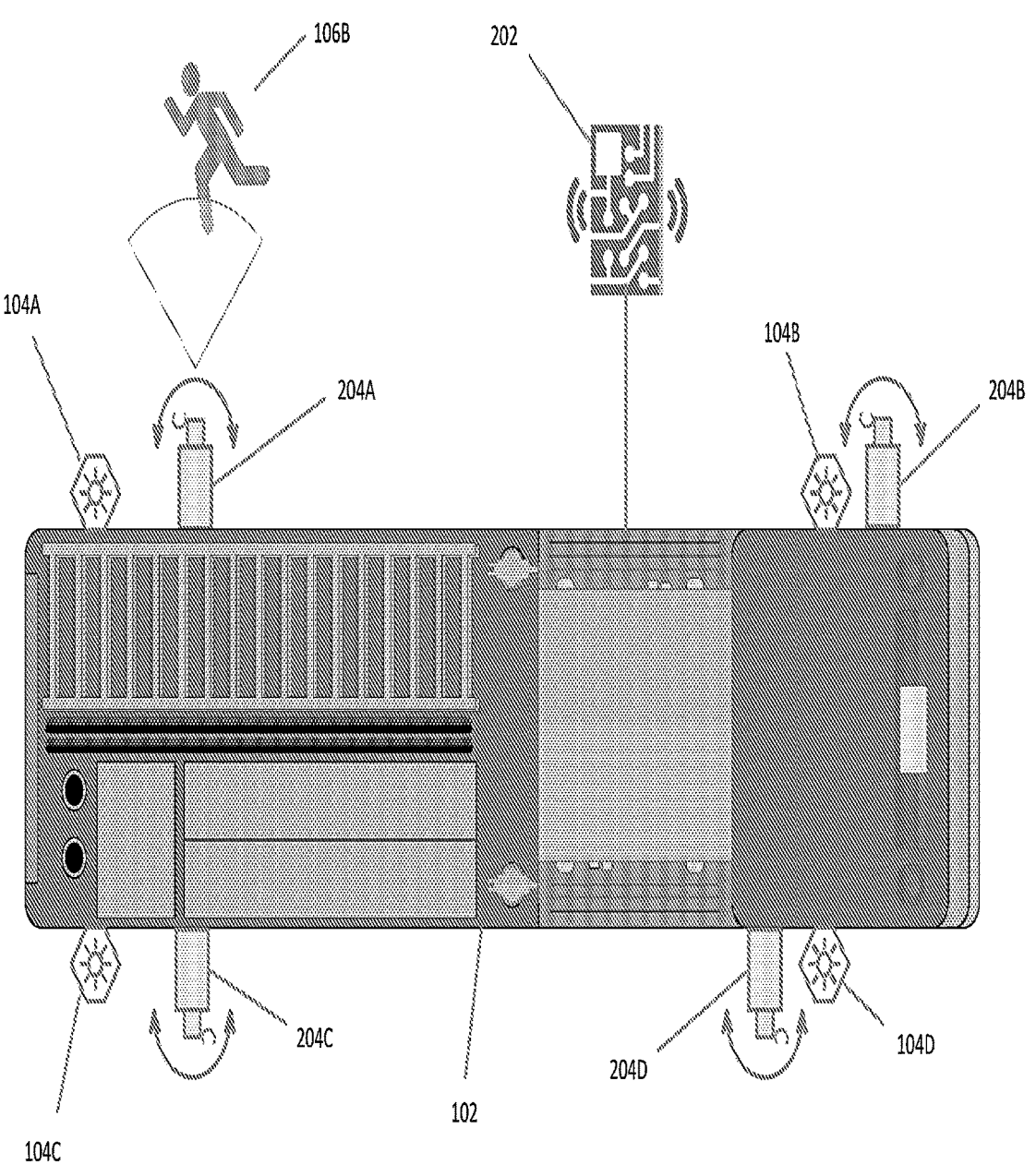
FIG. 2 schematically illustrates an example of an illumination control system which can be installed in operative association with one or more lighting systems of an emergency vehicle.

FIG. 2 illustrates an example of an illumination control system 202 which can be installed in operative association with one or more lighting systems of the vehicle 102. In various embodiments, the system 202 may be configured to receive data from one or more cameras 204A-204D placed near or adjacent to the scene lights 104A-104D so that the field-of-view of each of the cameras 204A-204D approximately corresponds to the areas of the emergency area being illuminated by each of the lights 104A-104D (respectively). Components of the system 202 (as described herein) may be part of the cameras 204A-204D, may be part of the internal systems of the vehicle 102, may be part of a system external to the vehicle 102, and/or may be shared or distributed in different combinations among different sources.

Figure 3:
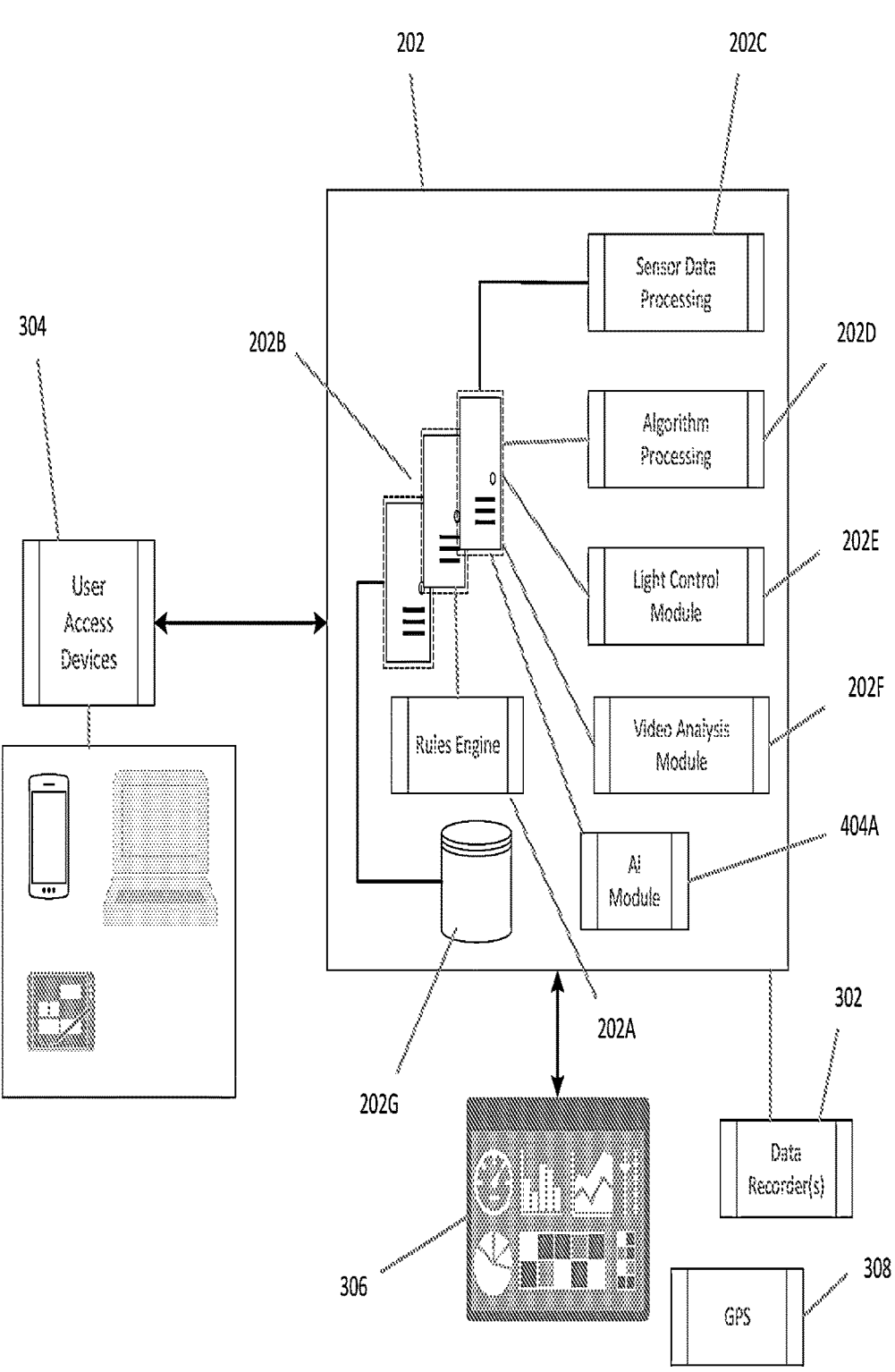
FIG. 3 is a system architecture diagram showing different aspects of an illumination control system and its operating environment.
Figure 4:
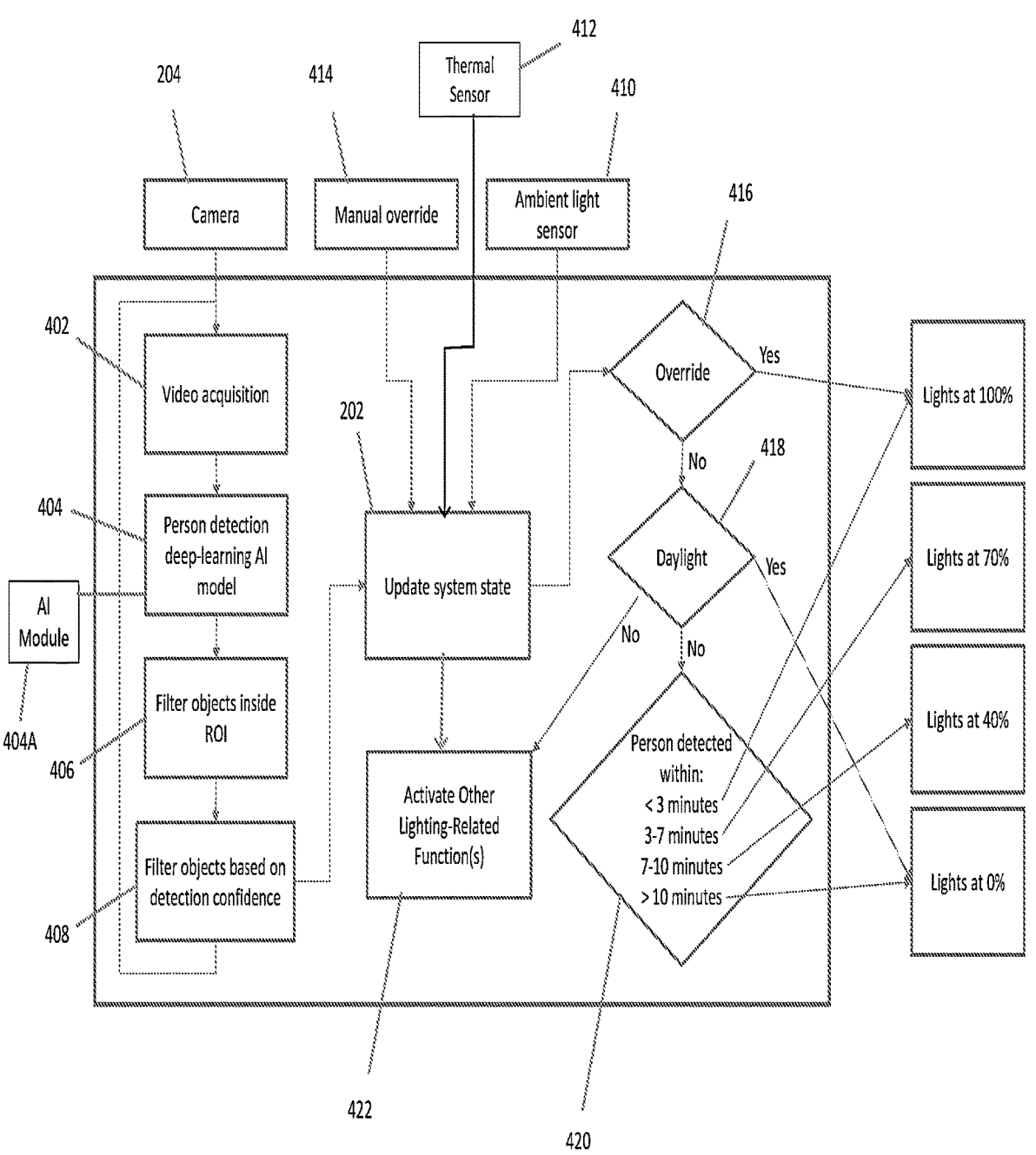
FIG. 4 is a combined computer system architecture and process flow diagram illustrating various examples of the operation of an illumination control system.

With reference to the system diagram of FIG. 3 and the combined process flow and architecture diagram of FIG. 4, the cameras 204A-204D may be used in various embodiments for different functions at the emergency scene. In one aspect, the cameras 204A-204D may be configured for recording events occurring the scene, such as in connection with a data recorder 302, for example, or other suitable data storage media. In various embodiments, the data recorder 302 may be an event data recorder, a video recorder, an audio recorder, or other types of recording devices programmed for capturing images, sounds, verbalizations, or signals derived from the areas around the vehicle 102. After the cameras 204A-204D have acquired image data or video data at the video acquisition stage 402, an artificial intelligence (AI) module can be employed at stage 404 to detect or determine if a person has entered a region of interest (ROI) predefined for the field-of-view for each camera 204A-204D. For example, the worker 106B entering the ROI of the camera 204A may be detected as shown in the example of FIG. 2. In one aspect, the AI module 404A used at stage 404 may be embodied as software implementing a deep learning AI model, for example.

At stages 406 and 408, it can be seen that the AI module 404A not only detects persons and objects of interest in the captured video or image data, but the AI module 404A can also be programmed to calculate a confidence value for each detected person or object. In one aspect, the system 202 can be configured to define a minimum confidence value and to ignore less reliable detection with small confidence values. This gives users of the system 202 additional flexibility and balance between effective use of scene lights to illuminate the emergency scene versus preserving battery power for the vehicle 102. In one aspect, the ROI may be defined in the camera field of view to limit person detection to certain parts of the image. By default, in another aspect, the ROI could cover the full image, or could be a pre-configured polygon or any other shape corresponding to the effective illumination area of the scene lights 104A-104D. For example, by excluding the very top image area from the ROI, the system 202 could limit detections to only occur for people within a certain distance from the vehicle 102. In a more sophisticated and flexible approach, the ROI could be adjusted for every specific work area, such as by drawing or rendering a predetermined ROI to be applied by the system 202.

It can be appreciated that video-based object detection AI overcomes multiple issues associated with motion detectors: motion detectors may be triggered by movement of foliage, vehicles in the background, or animals, and this movement may or may not necessarily impact the work of emergency personnel at the emergency scene. Also, motion detectors typically fail to detect stationary people or objects in the scene, and this could incorrectly cause the scene lights 104A-104D to deactivate at inappropriate times. In certain embodiments, neural network AI models applied to this emergency services application domain may require additional training and tuning to detect firefighters wearing protective equipment, breathing apparatus, carrying and operating tools, etc.

In certain embodiments, the system 202 may receive and process input data signals from different types of sensors. In one aspect, ambient light sensor 410 (which may comprise a photocell) may be used to determine lighting conditions in the vicinity of the vehicle 102, such as lighting conditions associated with whether it is daylight, evening, dawn, or dusk. In another aspect, a thermal sensor 412 may be used to detect temperature conditions of people or objects in the vicinity of the vehicle 102, such as when fire 108 might be approaching or near the vehicle 102, for example. In still another aspect, an override switch 414 may be engaged so that a user can override the intelligence or control of the system 202 at stage 416 and force the lights 104A-104D to remain activated or deactivated, as appropriate. The switch 414 could be a physical switch on the vehicle 102, for example, or a remote control device configured to enable the override stage 416 from anywhere in the emergency scene.

In various embodiments, the system 202 may be programmed with logic or algorithmic based rules (perhaps executed by a rules engine 202A) to determine to what degree of brightness or dimness, when, and/or for how long to activate or deactivate the lights 104A-104D. In one example, at stage 418, one such rule may be executed if the ambient light sensor 410 determines that lighting conditions in the vicinity of the vehicle 102 indicate that it is daylight, then the lights 104A-104D can be deactivated. In another example, at stage 420, another rule may be executed to the extent that if there is no person recognized within the field of view of the camera 204A for three minutes, then the scene light 104A would be dimmed to 70% of its intensity or have its power reduced by 30%. If a person or object is subsequently detected, then the light 104A can be reactivated to 100%. In another example, if after four more minutes no persons or objects are detected, then the light 104A could be dimmed to 40%, thereby reducing overall power consumption of the light 104A by 60%. Subsequently, after three more minutes of no person or object being detected, the light 104A could be completely deactivated.

It can be appreciated that the system 202 may be programmed to activate or deactivate a variety of other lighting-related functions 420. In one example, the system 202 may direct one or more of the lights 104A-104D to flash at different frequencies, perhaps at a frequency which indicates that a given light 104A is about to deactivate itself because its associated camera 204A has not detected the presence of a person or object in its field of view within a predetermined time threshold. The light 104A flashing at another frequency may indicate that a threat such as fire 108 is approaching the vehicle 102 within a threshold distance or with an unacceptably high level of heat intensity (as might be detected by the thermal sensor 412, for example). In another aspect, the light 104A flashing at a certain frequency may indicate that vehicle 102 power is currently at a predetermined low threshold, which indicates that immediate action must be taken by emergency personnel.

In various embodiments of the invention, the system 202 may include one or more computer processors 202B programmed to execute the tasks of various modules 202C-202F within the system 202. A sensor data processing module 202C may be programmed for receiving and processing input data signals received from the various types of sensors described herein, and for reporting the results of its data processing to the processor 202B. An algorithm processing module 202D may be programmed for executing the logic or decision-making tasks associated with the AI processing described herein. A light control module 202E may be configured for generating instructions to be communicated to the lights 104A-104D, such as when to activate or deactivate and at what intensity level of illumination. A video analysis module 202F can be programmed to receive and process image data or video data captured by the various cameras 204A-204D used by the vehicle 102. The system 202 may further include different kinds of data storage media 202G into which data can be stored or from which data can be retrieved for use in connection with the different processing tasks performed by the system 202.

In certain embodiments, the system 202 may be accessed and operated through a variety of different access devices 304 such as mobile phones, laptops, tablets, or other user access computing devices. In other embodiments, the system 202 may be accessed and operated through console controls 306 installed in the vehicle 102, for example. The system 202 may also be accessed or controlled through a combination of both user access devices 304 and console controls 306. In other embodiments, a global positioning system (GPS) module 308 may be operatively associated with the system 202 to facilitate capturing positional or geographical data associated with the vehicle 102 and/or aspects of the emergency scene. Data derived from the GPS module 308 may be used to determine whether, when, and to what extent to activate or deactivate the lights 104A-104D of the vehicle 102. In one example, GPS data may indicate that the emergency scene is at an underground or tunnel location, and this suggests to the system 202 that the lights 104A-104D will need to remain fully activated to provide illumination during the course of work performed by emergency personnel at the scene.

An illumination control system can be configured for operative association with a vehicle lighting system. The illumination control system may comprise at least one computer processor programmed to execute at least one task of at least one computer-implemented module; a video analysis module configured for receiving data from one or more cameras positioned on an exterior of the vehicle, each camera having an associated region of interest (ROI) defined for a field-of-view for the camera; an artificial intelligence (AI) module programmed to detect whether a person or object of interest has entered the ROI of the camera; an algorithm processing module programmed for executing logic associated with one or more decision-making tasks in association with results of executing of the AI module; and a light control module configured for communicating computer-implemented instructions for activating or deactivating at least one scene light of the vehicle lighting system.

The algorithm processing module may be programmed with at least one algorithmic based rule for determining: at least one degree of brightness or dimness of at least one scene light of the vehicle lighting system; when to activate or deactivate at least one scene light of the vehicle lighting system; and/or at least one length of time to activate or deactivate at least one scene light of the vehicle lighting system.

The AI module may be configured to include software implementing a deep learning AI model. Also, the AI module may be programmed for: calculating a confidence value for each person or object detected in the ROI; and, ignoring a detected person or object in response to a comparison of the calculated confidence value to a minimum confidence value. The AI module may comprise an AI model trained with a data set for detecting at least one of a firefighter wearing protective equipment or a breathing apparatus.

The illumination control system may further comprise at least one camera placed adjacent to at least one scene light of the vehicle lighting system, so that the field-of-view of the camera corresponds to at least one area of interest of an emergency area being illuminated by the vehicle lighting system. The ROI of at least one camera configured to cover at least one of a full image, a pre-configured polygon portion of an image, or a shape corresponding to at least a portion of an area illuminated by at least one scene light.

A sensor data processing module can be included in the illumination control system which is programmed for receiving and processing input data signals received from at least one sensor operatively associated with the vehicle. One or more ambient light sensors can be configured to determine at least one lighting condition in a vicinity of the vehicle.

The light control module can be programmed to activate, deactivate, brighten, or dim at least one scene light of the vehicle lighting system in response to an input data signal received by the ambient light sensor. The algorithm processing module can be programmed to direct the light control module to activate, deactivate, brighten, or dim at least one scene light of the vehicle lighting system in response to the AI module detecting whether a person or object of interest has entered or exited the ROI of at least one camera. Also, the algorithm processing module can be programmed to direct the light control module to activate, deactivate, brighten, or dim at least one scene light of the vehicle lighting system in response to the AI module detecting no person or object of interest in the ROI of at least one camera within a predetermined time threshold.

A thermal sensor can be operatively associated with the illumination control system which is configured to detect at least one temperature condition of at least one person or object of interest in a vicinity of the vehicle. The light control module can be programmed to flash at least one scene light of the vehicle lighting system at a predetermined frequency in response to receiving an input data signal from the thermal sensor of a presence of a predetermined level of heat intensity in the vicinity of the vehicle.

The illumination control system can be operatively connected to at least a portion of at least one power system of the vehicle. By leveraging this operative connection, the light control module can be programmed to flash at least one scene light of the vehicle lighting system at a predetermined frequency in response to a predetermined threshold power level of the power system of the vehicle.

The examples presented herein can be intended to illustrate potential and specific implementations of the present invention. It can be appreciated that the examples can be intended primarily for purposes of illustration of the invention for those skilled in the art. No particular aspect or aspects of the examples can be necessarily intended to limit the scope of the present invention. For example, no particular aspect or aspects of the examples of system architectures, user interface layouts, algorithm use cases, or screen displays described herein are necessarily intended to limit the scope of the invention.

It is to be understood that the figures and descriptions of the present invention have been simplified to illustrate elements that can be relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore, the invention as may be defined by such means-plus-function claims, resides in the fact that the functionalities provided by the various recited means can be combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium. In certain embodiments, artificial intelligence techniques, machine learning algorithms, and/or rules-based algorithms may be employed as unconventional tools for performing the processes and executing the computer systems described herein.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual (e.g., cloud-based), permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth.

Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to execution of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that can be located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal; and examples of scripting languages include Bourne script, JavaScript, Python, TypeScript, Ruby, PHP, and Perl. Various embodiments may be employed in a Lotus Notes environment, for example. Such software may be stored on any type of suitable computer-readable medium or media such as, for example, a magnetic or optical storage medium.

Thus, the execution and behavior of the embodiments can be described without specific reference to the actual software code. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, cellular network communication, power line communication, or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs) remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 (Oracle) application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture. Certain embodiments of the invention may employ web servers such as Apache web servers, for example.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Various embodiments may be described herein in the general context of computer executable instructions, such as software, program modules, and/or engines being executed by a computer. Generally, software, program modules, and/or engines include any software element arranged to perform particular executions or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where executions can be performed by one or more remote processing devices that can be linked through a communications network. In a distributed computing environment, software, program modules, and/or engines may be located in both local and remote computer storage media including memory storage devices.

Although some embodiments may be illustrated and described as comprising functional components, software, engines, and/or modules performing various executions, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various executions of one or more embodiments. In various embodiments, for example, the article of manufacture may comprise a magnetic disk, optical disk, flash memory or firmware containing computer program instructions suitable for execution by an application specific processor.

Additionally, it is to be appreciated that the embodiments described herein illustrate example implementations, and that the functional elements, logical blocks, modules, and circuits elements may be implemented in various other ways which can be consistent with the described embodiments. Furthermore, the executions performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Reference to "one embodiment" or "an embodiment" means that a particular feature, structure, or characteristic described in connection with the embodiment is comprised in at least one embodiment. The appearances of the phrase "in one embodiment" or "in one aspect" in the specification do not necessarily all refer to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms can be not necessarily intended as synonyms for each other. For example, some embodiments may be described using the terms "com1ected" and/or "coupled" to indicate that two or more elements can be in direct physical or electrical contact with each other. The term "coupled," however, also may mean that two or more elements can be not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and can be comprised within the scope thereof. Furthermore, all examples and conditional language recited herein can be principally intended to aid the reader in understanding the principles described in the present disclosure and the concepts contributed to furthering the art, and can be to be construed as being without limitation to such specifically recited examples and conditions. Moreover, all statements herein reciting principles, aspects, and embodiments as well as specific examples thereof, can be intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by general purpose hardware as discussed above, as an alternative the same may also be embodied in dedicated hardware or a combination of software, hardware and/or dedicated hardware. If embodied in dedicated hardware, each can be implemented as a circuit or state machine that employs any one of or a combination of a number of technologies. These technologies may include, but can be not limited to, discrete logic circuits having logic gates for implementing various logic functions upon an application of one or more data signals, application specific integrated circuits having appropriate logic gates, or other components, etc. Such technologies can be generally well known by those of ordinary skill in the art and, consequently, can be not described in detail herein.

The flow charts and methods described herein show the functionality and execution of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s). Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be omitted or not performed. It is understood that all such variations can be within the scope of the present disclosure.

The terms "a" and "an" and "the" and similar referents used in the context of the present disclosure (especially in the context of the following claims) can be to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as though it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein can be not to be construed as limitations. Each group member may be referred to and claimed individually or in any combination with other members of the group or other elements found herein. It is anticipated that one or more members of a group may be comprised in, or deleted from, a group for reasons of convenience and/or patentability.

In various embodiments of the present invention, different types of artificial intelligence tools and techniques can be incorporated and implemented. Search and optimization tools including search algorithms, mathematical optimization, and evolutionary computation methods can be used for intelligently searching through many possible solutions. For example, logical operations can involve searching for a path that leads from premises to conclusions, where each step is the application of an inference rule. Planning algorithms can search through trees of goals and subgoals, attempting to find a path to a target goal, in a process called means-ends analysis.

Heuristics can be used that prioritize choices in favor of those more likely to reach a goal and to do so in a shorter number of steps. In some search methodologies heuristics can also serve to eliminate some choices unlikely to lead to a goal. Heuristics can supply a computer system with a best estimate for the path on which the solution lies. Heuristics can limit the search for solutions into a smaller sample size, thereby increasing overall computer system processing efficiency.

Propositional logic can be used which involves truth functions such as "or" and "not" search terms, and first-order logic can add quantifiers and predicates, and can express facts about objects, their properties, and their relationships with each other. Fuzzy logic assigns a degree of truth (e.g., between 0 and 1) to vague statements which may be too linguistically imprecise to be completely true or false. Default logics, non-monotonic logics and circumscription are forms of logic designed to help with default reasoning and the qualification problem. Several extensions of logic can be used to address specific domains of knowledge, such as description logics, situation calculus, event calculus and fluent calculus (for representing events and time), causal calculus, belief calculus (belief revision); and modal logics. Logic for modeling contradictory or inconsistent statements arising in multi-agent systems can also be used, such as paraconsistent logics.

Probabilistic methods can be applied for uncertain reasoning, such as Bayesian networks, hidden Markov models, Kalman filters, particle filters, decision theory, and utility theory. These tools and techniques help the system execute algorithms with incomplete or uncertain information. Bayesian networks are tools that can be used for various problems: reasoning (using the Bayesian inference algorithm), learning (using the expectation-maximization algorithm), planning (using decision networks), and perception (using dynamic Bayesian networks). Probabilistic algorithms can be used for filtering, prediction, smoothing and finding explanations for streams of data, helping perception systems to analyze processes that occur over time (e.g., hidden Markov models or Kalman filters). Artificial intelligence can use the concept of utility as a measure of how valuable something is to an intelligent agent. Mathematical tools can analyze how an agent can make choices and plan, using decision theory, decision analysis, and information value theory. These tools include models such as Markov decision processes, dynamic decision networks, game theory and mechanism design.

The artificial intelligence techniques applied to embodiments of the invention may leverage classifiers and controllers. Classifiers are functions that use pattern matching to determine a closest match. They can be tuned according to examples known as observations or patterns. In supervised learning, each pattern belongs to a certain predefined class which represents a decision to be made. All of the observations combined with their class labels are known as a data set. When a new observation is received, that observation is classified based on previous experience. A classifier can be trained in various ways; there are many statistical and machine learning approaches. The decision tree is one kind of symbolic machine learning algorithm. The naive Bayes classifier is one kind of classifier useful for its scalability, in particular. Neural networks can also be used for classification. Classifier performance depends in part on the characteristics of the data to be classified, such as the data set size, distribution of samples across classes, dimensionality, and the level of noise. Model-based classifiers perform optimally when the assumed model is an optimized fit for the actual data. Otherwise, if no matching model is available, and if accuracy (rather than speed or scalability) is a primary concern, then discriminative classifiers (e.g., SVM) can be used to enhance accuracy.

A neural network is an interconnected group of nodes which can be used in connection with various embodiments of the invention, such as execution of various methods, processes, or algorithms disclosed herein. Each neuron of the neural network can accept inputs from other neurons, each of which when activated casts a weighted vote for or against whether the first neuron should activate. Learning achieved by the network involves using an algorithm to adjust these weights based on the training data. For example, one algorithm increases the weight between two connected neurons when the activation of one triggers the successful activation of another. Neurons have a continuous spectrum of activation, and neurons can process inputs in a non-linear way rather than weighing straightforward votes. Neural networks can model complex relationships between inputs and outputs or find patterns in data. They can learn continuous functions and even digital logical operations. Neural networks can be viewed as a type of mathematical optimization which performs a gradient descent on a multi-dimensional topology that was created by training the network. Another type of algorithm is a backpropagation algorithm. Other examples of learning techniques for neural networks include Hebbian learning, group method of data handling (GMDH), or competitive learning. The main categories of networks are acyclic or feedforward neural networks (where the signal passes in only one direction), and recurrent neural networks (which allow feedback and short-term memories of previous input events). Examples of feedforward networks include perceptrons, multi-layer perceptrons, and radial basis networks.

Deep learning techniques applied to various embodiments of the invention can use several layers of neurons between the network's inputs and outputs. The multiple layers can progressively extract higher-level features from the raw input. For example, in image processing, lower layers may identify edges, while higher layers may identify the concepts relevant to a human such as digits or letters or faces. Deep learning may involve convolutional neural networks for many or all of its layers. In a convolutional layer, each neuron receives input from only a restricted area of the previous layer called the neuron's receptive field. This can substantially reduce the number of weighted connections between neurons. In a recurrent neural network, the signal will propagate through a layer more than once. A recurrent neural network (RNN) is another example of a deep learning technique which can be trained by gradient descent, for example.

While various embodiments of the invention have been described herein, it should be apparent, however, that various modifications, alterations, and adaptations to those embodiments may occur to persons skilled in the art with the attainment of some or all of the advantages of the present invention. The disclosed embodiments can be therefore intended to include all such modifications, alterations, and adaptations without departing from the scope and spirit of the present invention as described herein.

What is claimed is:

1. An illumination control system configured for operative association with a vehicle lighting system, the illumination control system comprising:
   at least one computer processor programmed to execute at least one task of at least one computer-implemented module;
   a video analysis module configured for receiving data from one or more cameras positioned on an exterior of the vehicle, each camera having an associated region of interest (ROI) defined for a field-of-view for the camera;
   an artificial intelligence (AI) module programmed to detect whether a person or object of interest has entered the ROI of the camera;
   an algorithm processing module programmed for executing logic associated with one or more decision-making tasks in association with results of executing of the AI module;
   a light control module configured for communicating computer-implemented instructions for activating or deactivating at least one scene light of the vehicle lighting system;
   further comprising the AI module programmed for:
      calculating a confidence value for each person or object detected in the ROI of the camera; and
      ignoring a detected person or object in response to a comparison of the calculated confidence value to a minimum confidence value; and
   further comprising a thermal sensor configured to detect at least one fire approaching the vehicle:
      within a threshold distance from the vehicle, and/or
      with a predetermined level of heat intensity.

2. The system of claim 1, further comprising the algorithm processing module programmed with at least one algorithmic based rule for determining:
   at least one degree of brightness or dimness of at least one scene light of the vehicle lighting system;
   when to activate or deactivate at least one scene light of the vehicle lighting system; and/or
   at least one length of time to activate or deactivate at least one scene light of the vehicle lighting system.

3. The system of claim 1, further comprising the AI module including software implementing a deep learning AI model.

4. The system of claim 1, further comprising the AI module comprising an AI model trained with a data set for detecting at least one of a firefighter wearing protective equipment or a breathing apparatus.

5. The system of claim 1, further comprising at least one camera placed adjacent to at least one scene light of the vehicle lighting system, so that the field-of-view of the camera corresponds to at least one area of interest of an emergency area being illuminated by the vehicle lighting system.

6. The system of claim 1, further comprising the ROI of at least one camera configured to cover at least one of a full image, a pre-configured polygon portion of an image, or a shape corresponding to at least a portion of an area illuminated by at least one scene light.

7. The system of claim 1, further comprising a sensor data processing module programmed for receiving and processing input data signals received from at least one sensor operatively associated with the vehicle.

8. The system of claim 7, further comprising at least one ambient light sensor configured to determine at least one lighting condition in a vicinity of the vehicle.

9. The system of claim 8, wherein the light control module is programmed to activate, deactivate, brighten, or dim at least one scene light of the vehicle lighting system in response to an input data signal received by the ambient light sensor.

10. The system of claim 1, wherein the algorithm processing module is programmed to direct the light control module to activate, deactivate, brighten, or dim at least one scene light of the vehicle lighting system in response to the AI module detecting whether a person or object of interest has entered or exited the ROI of at least one camera.

11. The system of claim 1, wherein the algorithm processing module is programmed to direct the light control module to activate, deactivate, brighten, or dim at least one scene light of the vehicle lighting system in response to the AI module detecting no person or object of interest in the ROI of at least one camera within a predetermined time threshold.

12. The system of claim 1, further comprising the thermal sensor configured to detect at least one temperature condition of at least one person or object of interest in a vicinity of the vehicle.

13. The system of claim 12, further comprising the light control module programmed to flash at least one scene light of the vehicle lighting system at a predetermined frequency in response to receiving an input data signal from the thermal sensor of a presence of a predetermined level of heat intensity in the vicinity of the vehicle.

14. The system of claim 1, further comprising:

the illumination control system operatively connected to at least a portion of at least one power system of the vehicle; and the light control module programmed to flash at least one scene light of the vehicle lighting system at a predetermined frequency in response to a predetermined threshold power level of the power system of the vehicle.

\* \* \* \* \*